United States Patent
Sakashita et al.

(10) Patent No.: US 10,414,065 B2
(45) Date of Patent: Sep. 17, 2019

(54) METHOD FOR MANUFACTURING HONEYCOMB STRUCTURE, APPARATUS FOR MANUFACTURING HONEYCOMB STRUCTURE, AND HONEYCOMB STRUCTURE

(71) Applicant: NGK INSULATORS, LTD., Nagoya (JP)

(72) Inventors: Satoshi Sakashita, Yokkaichi (JP); Hiroyuki Nagaoka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 264 days.

(21) Appl. No.: 15/258,274

(22) Filed: Sep. 7, 2016

(65) Prior Publication Data

US 2017/0072588 A1   Mar. 16, 2017

(30) Foreign Application Priority Data

Sep. 11, 2015   (JP) .................................. 2015-179728

(51) Int. Cl.
*B28B 1/00*   (2006.01)
*C04B 38/00*   (2006.01)
(Continued)

(52) U.S. Cl.
CPC .............. *B28B 1/001* (2013.01); *B33Y 10/00* (2014.12); *B33Y 30/00* (2014.12); *B33Y 80/00* (2014.12);
(Continued)

(58) Field of Classification Search
CPC ............................ B28B 1/001; C04B 38/0006
See application file for complete search history.

(56) References Cited

U.S. PATENT DOCUMENTS 3,885,977 A * 5/1975 Lachman ............... B01D 53/86
428/116
4,434,117 A * 2/1984 Inoguchi ............... C04B 35/195
264/631
(Continued)

FOREIGN PATENT DOCUMENTS

DE   60 2004 007 054 T2   3/2008
DE   10 2006 000 133 B4   11/2013
JP         2013-216575 A1   10/2013

OTHER PUBLICATIONS

German Office Action (Application No. 10 2016 010 822.3) dated Sep. 29, 2017 (with English translation).

*Primary Examiner* — Erin Snelting
(74) *Attorney, Agent, or Firm* — Burr & Brown, PLLC

(57) ABSTRACT

A method for manufacturing a honeycomb structure according to the present invention is a method for manufacturing a honeycomb structure provided with partitions forming a plurality of cells. This manufacturing method includes a structure formation process including a pore-forming material placement step of placing a pore-forming material for forming pores in the partitions, a raw material placement step of placing tabular grains and raw material grains such that the tabular grains are arranged in a predetermined direction with respect to the partition surfaces while the tabular grains and the raw material grains constitute a raw material for forming the partitions, and a sintering step of sintering the placed raw material. The honeycomb structure is produced by repeating the structure formation process a plurality of times.

9 Claims, 8 Drawing Sheets

(51) Int. Cl.
   *B33Y 10/00*   (2015.01)
   *B33Y 30/00*   (2015.01)
   *B33Y 80/00*   (2015.01)
   *B01D 46/24*   (2006.01)
   *F01N 3/28*   (2006.01)
   *F01N 3/022*   (2006.01)

(52) U.S. Cl.
   CPC ...... *C04B 38/0006* (2013.01); *B01D 46/2418* (2013.01); *F01N 3/0222* (2013.01); *F01N 3/2828* (2013.01); *F01N 2330/06* (2013.01)

(56) References Cited

U.S. PATENT DOCUMENTS

| | | | | |
|---|---|---|---|---|
| 6,284,188 | B1* | 9/2001 | Andou | C04B 35/195 264/177.12 |
| 6,506,336 | B1* | 1/2003 | Beall | C04B 35/195 264/177.12 |
| 6,508,852 | B1* | 1/2003 | Hickman | B01D 39/2068 422/169 |
| 7,481,962 | B2 | 1/2009 | Kotani et al. | |
| 9,597,837 | B1* | 3/2017 | Cesarano, III | C04B 38/0006 |
| 2004/0177600 | A1 | 9/2004 | Ichikawa et al. | |
| 2006/0105139 | A1* | 5/2006 | Suwabe | B01D 46/0001 428/116 |
| 2006/0215814 | A1* | 9/2006 | Kotani | C01B 33/26 378/75 |
| 2010/0191360 | A1* | 7/2010 | Napadensky | G06T 17/00 700/98 |
| 2011/0190904 | A1* | 8/2011 | Lechmann | A61B 17/7208 623/23.61 |
| 2015/0273380 | A1* | 10/2015 | Sakashita | C04B 38/009 55/522 |
| 2015/0352639 | A1* | 12/2015 | Toyserkani | B29C 67/02 428/201 |
| 2016/0038866 | A1* | 2/2016 | Gibson | B01D 39/2093 210/435 |
| 2016/0107106 | A1* | 4/2016 | Brown | B01D 45/04 210/496 |
| 2016/0121271 | A1* | 5/2016 | Lescoche | C04B 38/0006 210/500.25 |
| 2016/0128837 | A1* | 5/2016 | Juszczyk | A61F 2/30756 623/18.11 |
| 2016/0282848 | A1* | 9/2016 | Hellestam | G05B 19/4099 |
| 2017/0008236 | A1* | 1/2017 | Easter | B29C 64/153 |
| 2017/0072589 | A1* | 3/2017 | Sakashita | B33Y 10/00 |
| 2018/0117845 | A1* | 5/2018 | Buller | B29C 64/282 |
| 2018/0250739 | A1* | 9/2018 | Saurwalt | B22F 1/0074 |

* cited by examiner

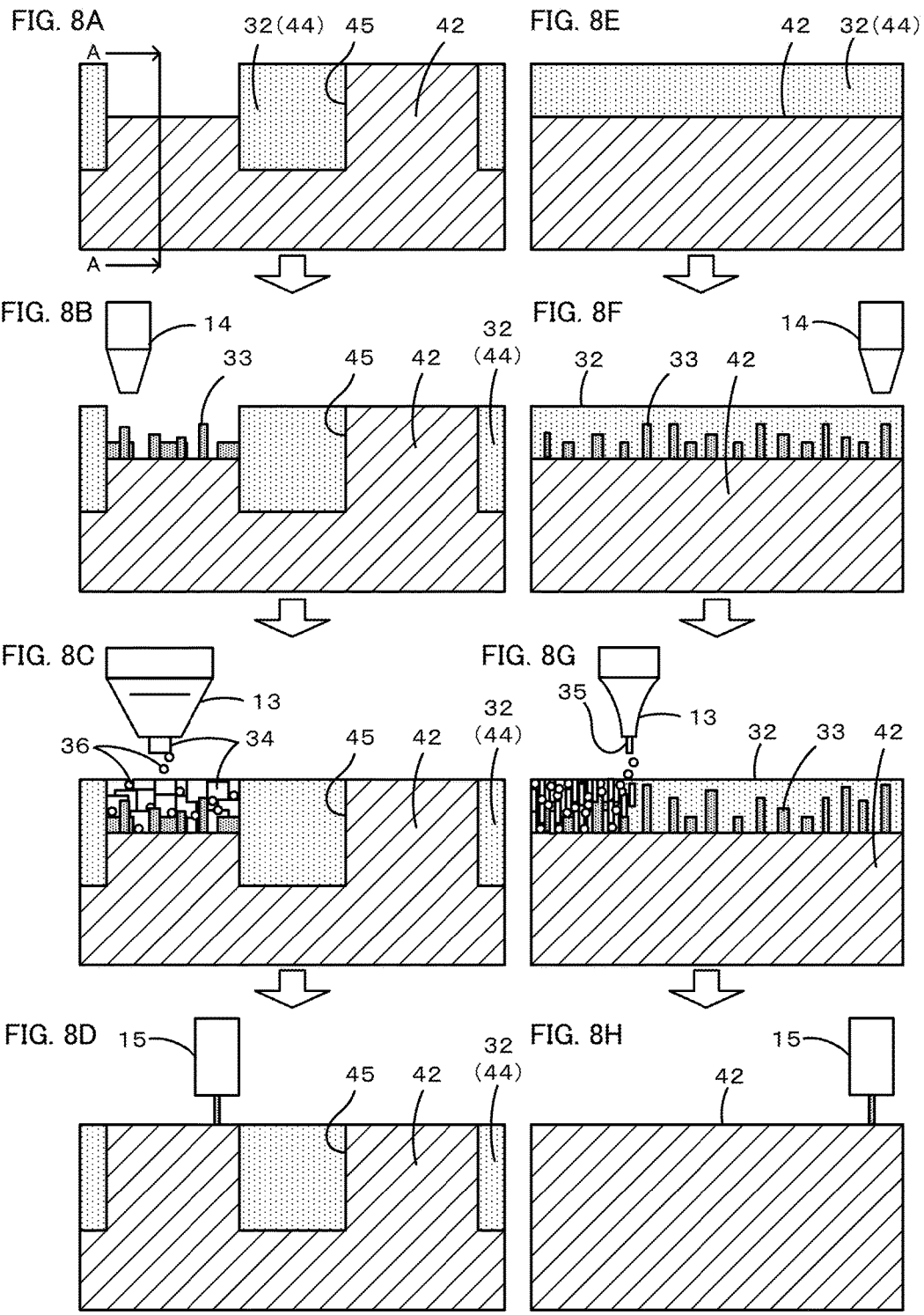

METHOD FOR MANUFACTURING HONEYCOMB STRUCTURE, APPARATUS FOR MANUFACTURING HONEYCOMB STRUCTURE, AND HONEYCOMB STRUCTURE

BACKGROUND OF THE INVENTION

1. Field of the Invention

The present invention relates to a method for manufacturing a honeycomb structure, an apparatus for manufacturing a honeycomb structure, and a honeycomb structure.

2. Description of the Related Art

To date, honeycomb structures and the like, which are used for cleaning exhaust gases, have been known as porous bodies. For example, PTL 1 describes a method for forming a honeycomb structure, wherein a body including an organic binder and a forming mixture (cordierite-formation material) containing at least hydrophilic talc and not containing a magnesium-containing material other than talc is formed into a honeycomb shape so as to produce a honeycomb formed body, and the honeycomb formed body is fired so as to obtain a honeycomb structure. In the manufacturing method, the hydrophilic talc is used and, thereby, the fluidity is improved even when water content in the body is low, and extrusion can be performed at a high speed.

CITATION LIST

Patent Literature

[PTL 1] Japanese Unexamined Patent Application Publication No. 2013-216575

SUMMARY OF THE INVENTION

Meanwhile, in general, a honeycomb structure may be heated during use. Therefore, high resistance to expansion and shrinkage due to heat is required. In PTL 1 described above, formability is enhanced by using the hydrophilic talc, but thermal stability is not sufficiently taken into consideration. Consequently, further enhancement of the thermal stability has been required.

The present invention was made in consideration of such problems, and the main object is to provide a new method for manufacturing a honeycomb structure, an apparatus for manufacturing a honeycomb structure, and a honeycomb structure, in which thermal stability can be further enhanced.

In order to achieve the above-described main object, the present inventors performed intensive investigations. As a result, it was found that the thermal stability of a honeycomb structure was able to be further enhanced by producing a honeycomb structure, in which tabular grains were arranged in a predetermined direction, by using a three-dimensional shaping apparatus. Consequently, the present invention was made.

A method for manufacturing a honeycomb structure according to the present invention is a method for manufacturing a honeycomb structure provided with partitions forming a plurality of cells. The method for manufacturing a honeycomb structure comprises the step of repeating a structure formation process a plurality of times. The structure formation process includes a pore-forming material placement step of placing a pore-forming material for forming pores in the partitions, a raw material placement step of placing tabular grains and raw material grains such that the tabular grains are arranged in a predetermined direction with respect to the partition surfaces while the tabular grains and the raw material grains constitute a raw material for forming the partitions, and a sintering step of sintering the placed raw material.

An apparatus for manufacturing a honeycomb structure according to the present invention is an apparatus for manufacturing a honeycomb structure provided with partitions forming a plurality of cells. The apparatus for manufacturing a honeycomb structure comprises a pore-forming material placement portion for placing a pore-forming material that forms pores in the partitions, a raw material placement portion for placing tabular grains and raw material grains such that the tabular grains are arranged in a predetermined direction with respect to the partition surfaces while the tabular grains and the raw material grains constitute a raw material for forming the partitions, a sintering portion for sintering the placed raw material, and a control portion for controlling repetition of the placement of the pore-forming material, the placement of the raw material, and the sintering of the raw material a plurality of times.

A honeycomb structure according to the present invention includes partitions that contain cordierite, in which crystal grains based on tabular grains in a raw material are arranged in the direction perpendicular to partition surfaces, and form cells.

According to the present invention, the thermal stability of a honeycomb structure can be further enhanced. The reason for this is surmised, for example, as described below. For example, regarding the honeycomb structure formed from the cordierite in PTL 1 above, kaoline, which constitutes tabular grains, and talc, which does not constitute tabular grains, may be used as the raw material, and cordierite crystal grains may be generated by firing. Also, the tabular grains may have properties such that thermal characteristics, e.g., thermal expansion coefficient, are different on a crystal axis basis. Then, crystal grains constituting the partition may grow during firing depending on the direction of the crystal axis of the tabular grains. In the present invention, the thermal stability, e.g., thermal shock resistance based on the thermal expansion coefficient, can be further enhanced by using tabular grains and raw material grains that have such characteristics and arranging the tabular grains in a preferable predetermined direction.

BRIEF DESCRIPTION OF THE DRAWINGS

FIGS. 8A to 8H are explanatory diagrams showing three-dimensional shaping routine of a honeycomb structure in which the predetermined direction of the tabular grains is changed.

DETAILED DESCRIPTION OF THE INVENTION

Figure 1:
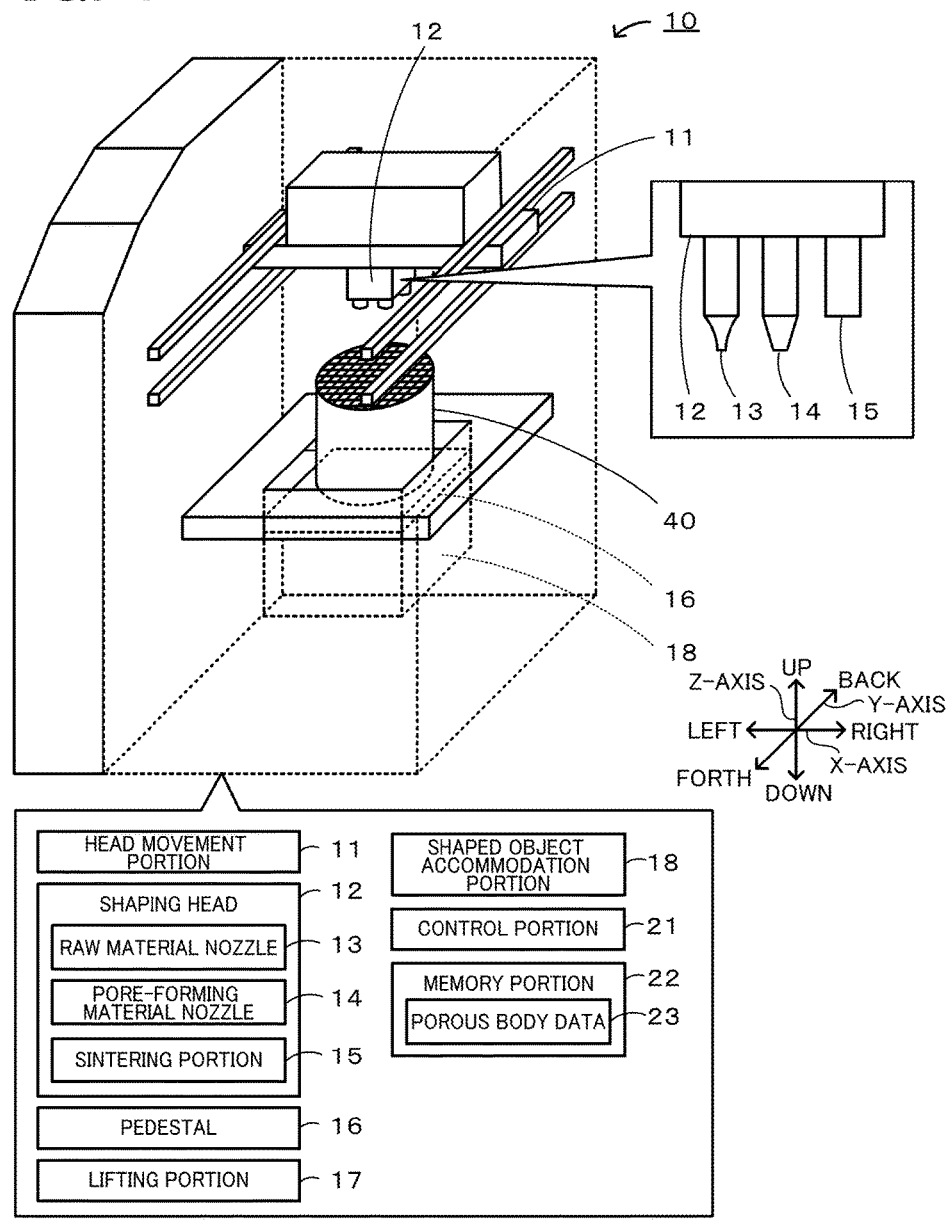
FIG. 1 is a schematic explanatory diagram showing an example of a three-dimensional shaping apparatus 10.
Figure 2:
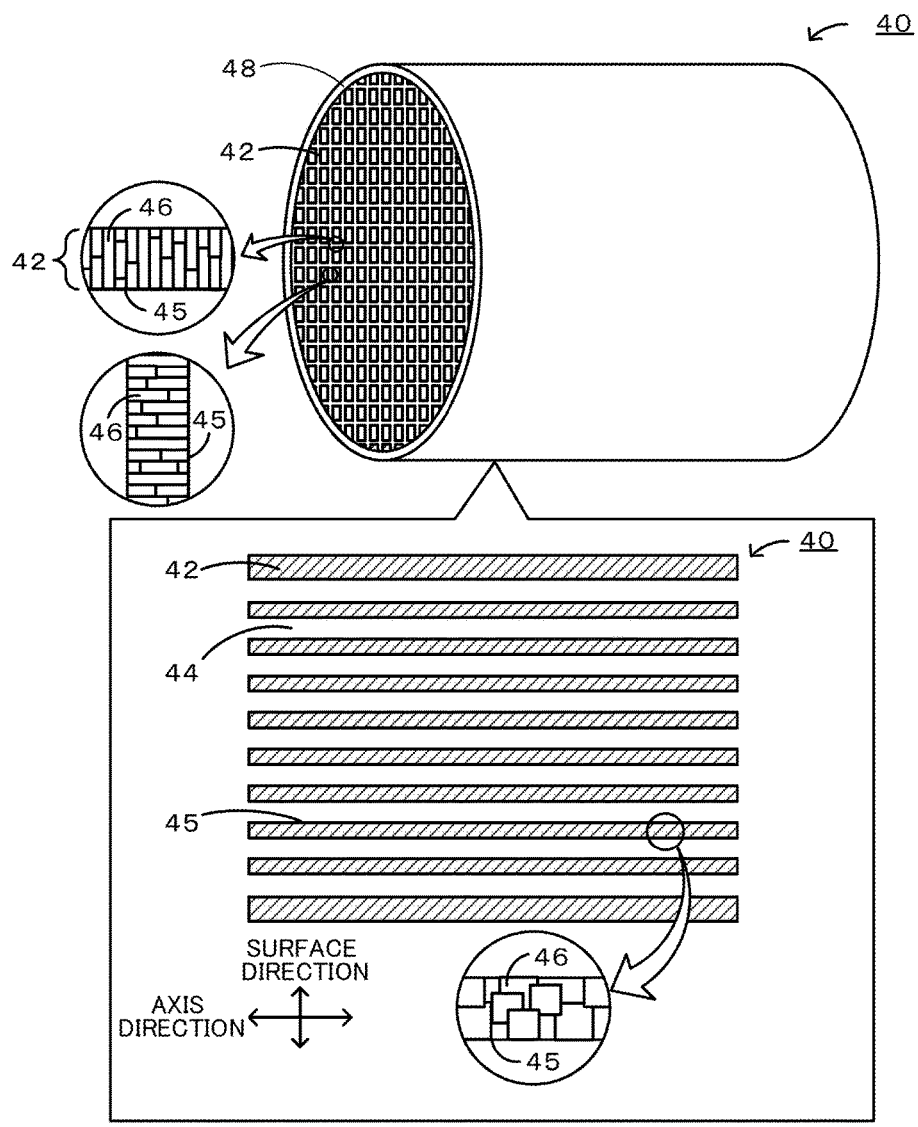
FIG. 2 is an explanatory diagram showing an example of a honeycomb structure 40.

The embodiments for realizing the present invention will be described with reference to the drawings. FIG. 1 is a schematic explanatory diagram showing an example of a three-dimensional shaping apparatus 10 according to an embodiment of the present invention. FIG. 2 is a schematic explanatory diagram showing an example of the configuration of a honeycomb structure 40 according to an embodiment of the present invention. In this regard, in the three-dimensional shaping apparatus 10 according to the present embodiment, the lateral direction (X-axis), the forward and backward directions (Y-axis), and the vertical direction (Z-axis) are as shown in FIG. 1. In addition, regarding the honeycomb structure 40, the formation direction of the cell 44 is denoted as an axis direction, and the direction orthogonal to the formation direction of the cell 44 is denoted as a surface direction (FIG. 2).

(Honeycomb Structure)

To begin with, the honeycomb structure 40 according to the present embodiment will be described. As shown in FIG. 2, the honeycomb structure 40 according to the present embodiment includes partitions 42 forming the cells 44, and a protective member 48 is disposed around the periphery thereof. The honeycomb structure 40 is produced by, for example, the method for manufacturing a honeycomb structure according to the present invention. There is no particular limitation regarding the external shape of the honeycomb structure 40, and the shape of a circular cylinder, quadratic prism, elliptic cylinder, or hexagonal column can be employed. The shape of the cross-section of the cell 44 can be the polygonal shape of a triangle, quadrangle, hexagon, or octagon, a streamlined shape e.g., a circle or an ellipse, or combinations thereof. In this regard, FIG. 2 shows an example of a honeycomb structure 40 configured to have a circular cylindrical external shape and to include rectangular cells 44. The honeycomb structure 40 may be a honeycomb filter in which cells 44 with the one end portion opened and the other end portion sealed and cells 44 with one end portion sealed and the other end portion opened are alternately disposed. Also, a collection layer may be disposed on the partition surface 45.

In the honeycomb structure 40, the partition 42 is porous and is produced from, for example, tabular grains serving as a raw material. Preferably, the partition 42 is, for example, cordierite produced from kaoline, which constitutes tabular grains, and talc, which constitutes raw material grains. The thickness of the partition 42 is preferably 50 μm or more and 600 μm or less. The average pore diameter of the partition 42 is preferably 2 μm or more and 60 μm or less. Also, the porosity of the partition 42 is preferably 30 percent by volume or more and more preferably 35 percent by volume or more. Also, the porosity of the partition 42 is preferably 85 percent by volume or less and more preferably 65 percent by volume or less. Here, the porosity and the average pore diameter refer to the results of measurement by a mercury penetration method. The thermal expansion coefficient of the partition 42 is preferably within the range of $2.5 \times 10^{-6}/°$ C. or less and more preferably within the range of $0.8 \times 10^{-6}/°$ C. or less at 800° C. in the direction of the partition surface 45. In the case where the thermal expansion coefficient is $2.5 \times 10^{-6}/°$ C. or less, breakage and cracking of the honeycomb structure 40 at the time of heating, cooling, and the like can be further suppressed.

The partition 42 may contain cordierite in which the flat surfaces of crystal grains 46 based on the tabular grains of the raw material are arranged (oriented) in the direction perpendicular to the partition surface 45 (refer to FIG. 2). This arrangement direction is preferable because thermal expansion in the surface direction of the honeycomb structure 40 can be further suppressed. The cordierite has a characteristic that the thermal expansion coefficient depends on the direction of the crystal grain 46. Also, grain growth of the crystal grain 46 occurs depending on the direction of kaolin grains, which constitute the tabular grains of the raw material. In the honeycomb structure 40, crystal grains 46 of the cordierite can be arranged in a predetermined direction by arranging and fixing the tabular grains of the raw material in the predetermined direction. Consequently, the thermal characteristics of the honeycomb structure can be further improved. Alternatively, in the honeycomb structure 40, the partition 42 may contain cordierite in which the flat surfaces of crystal grains 46 based on the tabular grains of the raw material are arranged in the direction parallel to the partition surface 45 (refer to FIG. 5). In this regard, in the case where the arrangement direction of the crystal grains 46 of the honeycomb structure 40 is the direction parallel to the partition surface 45, thermal expansion in the axis direction of the honeycomb structure 40 can be further suppressed. Alternatively, the crystal grains 46 may be arranged in any direction at any location. For example, the flat surfaces of the crystal grains 46 of the honeycomb structure 40 may be arranged in the direction parallel to the partition surface 45 at predetermined locations in the axis direction and be arranged in the direction perpendicular to the partition surface 45 at other locations.

The honeycomb structure 40 can be used as, for example, a carrier of a three-way catalyst for exhaust gas cleaning. The partition 42 may carry, for example, a catalyst, e.g., a noble metal. Alternatively, the honeycomb structure 40 can be used as a carrier for forming a separation film that separates a predetermined component from a gas or liquid by forming the separation film on the partition surface 45. Also, the honeycomb structure 40 can be used as a filter having a function of filtering particulate matters (PM) in an exhaust gas.

(Method for Manufacturing Honeycomb Structure)

Next, a method for manufacturing a honeycomb structure according to the present embodiment will be described. This manufacturing method is a method for manufacturing a honeycomb structure provided with partitions for forming a plurality of cells. The manufacturing method includes at least a pore-forming material placement step of placing a pore-forming material for forming pores in the partitions and a raw material placement step of placing tabular grains and raw material grains such that the tabular grains are arranged in a predetermined direction with respect to the partition surfaces while the tabular grains and the raw material grains constitute a raw material for forming the partitions. An unfired compact of a honeycomb structure (honeycomb compact) can be produced by performing the pore-forming material placement step and the raw material placement step. Also, the method for manufacturing a honeycomb structure may further include a sintering step of sintering the honeycomb compact. Alternatively, the manufacturing method may include a structure formation process including the pore-forming material placement step, the raw material placement step, and the sintering step, and the structure formation process may be repeated a plurality of times. Consequently, for example, honeycomb structure layers can be formed one by one from the formed pore-forming material and the raw material. Also, a support material placement step of placing a support material for supporting the raw material may be performed before the pore-forming material placement step, as necessary. This manufacturing method may be executed by using a three-dimensional shaping apparatus specifically described later.

(Support Material Placement Step)

In this step, placement of the support material for supporting the raw material is performed. The support material is placed on, for example, a pedestal for supporting the honeycomb structure, a support material that has been disposed, an unfired compact in which the raw material has been placed, or a sintered body in which the raw material has been sintered. In this regard, in placement of the pore-forming material and placement of the raw material, as described later, the object, on which the material is placed, is the same as the object of placement of the support material. In this step, the support material is placed such that the shape of the target honeycomb structure is reproduced. For example, the support material is placed in the case where the raw material is disposed in a region in which a sintered body is not disposed as an underlying layer (for example, an overhanging portion) or in a region corresponding to a space, e.g., a cell. The support material may be composed of a hard-to-sinter material or ceramic grains. Examples of ceramic grains include alumina, silica, sand, SiC, aluminum titanate, mullite, silicon nitride, sialon, zirconia, and titania. In the case where ceramic grains are used as the support material, for example, the raw material for forming the honeycomb structure (tabular grains or raw material grains) may be used. In the case where the raw material for forming the honeycomb structure is used as the support material, the support material placement step and the raw material placement step may be performed at the same time or as a single step. Alternatively, the support material may be composed of an easy-to-remove resin or the like. In the case where the resin is used for the support material, the resin may be the same resin as that used as the pore-forming material. Examples of resins include thermoplastic resins, photo-curable resins, and thermosetting resins. Examples of thermoplastic resins include polyethylenes, polypropylenes, polystyrenes, polyvinyl chlorides, polyesters, polyamides, acrylonitrile-butadiene-styrene (ABS) resins, polycarbonate resins, and polylactic acid (PLA) resins. Photo-curable resins include ultraviolet-curable resins and the like. Examples of ultraviolet-curable resins include acrylate-based resins, e.g., urethane acrylate, acrylic resin acrylate, and epoxy acrylate, and epoxy-based resins. Examples of thermosetting resins include phenol resins, epoxy resins, melamine resins, urea resins, unsaturated polyester resins, alkyd resins, polyurethanes, and thermosetting polyimides.

(Pore-forming Material Placement Step)

In this step, placement of the pore-forming material that forms pores in the partitions is performed. The pore-forming material has to be composed of only, for example, a material that can be eliminated in a downstream step. The pore-forming material may be a resin that can be eliminated by heating or dissolution or may be ceramic grains that can be physically removed. Examples of resins include the above-described thermoplastic resins, photo-curable resins, and thermosetting resins. Preferably, the pore-forming material is placed such that, for example, an ideal pore structure is experimentally determined on the basis of structure analysis, simulation, and the like, and the resulting pore structure is reproduced. The pore-forming material may be placed, for example, in layers determined in consideration of the sizes of the grains constituting the partitions or on a layer-by-layer basis. Regarding the pore-forming material, particulate members may be placed, or a liquid member may be placed and solidified. In the case where the pore-forming material is the resin, fused deposition modeling (FDM), in which a heated resin is placed and thereafter cooled and solidified, may be used, or stereolithography (SLA), in which a resin before curing is placed and photo-cured, may be used.

(Raw Material Placement Step)

In this step, placement of the raw material on the placed pore-forming material or in the space (gap) formed around the pore-forming material is performed. Also, in this step, placement of tabular grains as the raw material for forming the partitions of the honeycomb structure is performed such that the tabular grains are arranged in a predetermined direction with respect to the partition surface. In this step, tabular grains may be placed by being supplied from a slit placed in a predetermined direction with respect to the partition surface. Consequently, the direction of the tabular grains can be controlled in a predetermined direction relatively easily by using the slit. In this step, tabular grains and raw material grains that are not tabular may be used as the raw material for forming the honeycomb structure. The tabular grains having a flat surface and a size within a range of 0.5 μm or more and 10 μm or less can be used. The cleavage index of the tabular grain is 0.84 or more, preferably 0.93 or more, and further preferably 0.96 or more. The cleavage index is measured in conformity with the method described in Japanese Unexamined Patent Application Publication No. 2006-265034. Also, the tabular grains and the raw material grains, which are used as the raw material, may be mixed into a solvent so as to produce a slurry or a paste and the resulting slurry or paste that serves as a raw material for forming the partition may be placed in a necessary portion. Examples of solvents include water and organic solvents, e.g., alcohols and acetone. Alternatively, the partition may be formed by discharging a powder without using a solvent. At this time, the individual grains may be fixed by using a fixing material for fixing grains. Here, the size of the tabular grains refers to an average value of the sizes of the tabular grains measured by using an image observed with an electron microscope. Also, the average grain size of the raw material grains refers to the median diameter (D50) of the raw material grains measured by using a laser diffraction/scattering particle size distribution analyzer, where the dispersion medium is water.

In this step, the honeycomb structure may be formed by repeating placement of the raw material in the direction (axis direction shown in FIG. 2) along the partition surface. Alternatively, the honeycomb structure may be formed by repeating placement of the raw material in the direction (surface direction shown in FIG. 2) perpendicular to the partition surface (refer to FIG. 6). In this step, the flat surfaces of the tabular grains may be arranged in the direction perpendicular to the partition surface. Consequently, stability can be ensured with respect to expansion and shrinkage in the direction of the flat surfaces of the tabular grains. At this time, the flat surfaces of the tabular grains may be arranged in the direction perpendicular to the partition surface and the flat surfaces of the tabular grains may be arranged in the direction (axis direction shown in FIG. 2) parallel to the cell formation direction (refer to FIG. 2). Alternatively, the flat surfaces of the tabular grains may be arranged in the direction perpendicular to the partition surface and the flat surfaces of the tabular grains may be arranged in the direction (surface direction shown in FIG. 2) orthogonal to the cell formation direction (refer to FIG. 7). Alternatively, in this step, the flat surfaces of the tabular grains may be arranged in the direction parallel to the partition surface (refer to FIG. 5). In this case as well, the stability can be ensured with respect to expansion and shrinkage in the direction of the flat surfaces of the tabular grains. In the raw material placement step, in order to form the partition containing cordierite, the tabular grains may contain kaolin grains, and the raw material grains may contain talc grains. Consequently, the thermal stability of the cordierite-based honeycomb structure can be further improved. In this step, the tabular grains and the raw material grains may be placed in a mixed state, or the tabular grains and the raw material grains may be placed separately. From the viewpoint of formation of crystal grains by sintering (reaction) of the tabular grains and the raw material grains, it is more preferable that the tabular grains and the raw material grains be placed in the mixed state.

(Sintering Step)

In this step, sintering of the placed raw material is performed. Also, in this step, removal of the pore-forming material may be performed together with sintering of the raw material. More preferably, sintering of the raw material and removal of the pore-forming material are performed at the same time. In the case where the raw material includes the tabular grains and the raw material grains, the sintering may be performed under the condition that sintering (reaction) of them occurs. For example, in the case where kaolin and talc constitutes the raw material, it is preferable that sintering be performed by a laser sintering method (SLS method). This method is preferable because the cordierite can be generated relatively simply. Examples of types of laser include a solid laser, e.g., Nd:YAG laser, and a gas laser, e.g., $CO_2$ laser. Alternatively, the sintering step may be performed by using arc discharge.

In the above-described method for manufacturing a honeycomb structure, the honeycomb structure is produced by repeating the support material placement step, the pore-forming material placement step, the raw material placement step, and the sintering step. Thereafter, a protective member is formed around the periphery of the resulting honeycomb structure. The protective member can be formed by applying a paste or slurry including ceramic grains around the periphery with no opening of the cell 44 and by performing firing.

(Apparatus for Manufacturing Honeycomb Structure)

Subsequently, a three-dimensional shaping apparatus 10, which is an apparatus for manufacturing a honeycomb structure, will be described. As shown in FIG. 1, the three-dimensional shaping apparatus 10 is an apparatus for manufacturing a honeycomb structure 40 provided with partitions 42 forming a plurality of cells 44. As shown in FIG. 1, the three-dimensional shaping apparatus 10 includes a head movement portion 11, a shaping head 12, a pedestal 16, a lifting portion 17, a shaped object accommodation portion 18, a control portion 21, and a memory portion 22.

The head movement portion 11 moves the shaping head 12 in the forward and backward (XY) direction. The head movement portion 11 includes a slider, which is guided by guiderails and is moved in the XY direction, and a motor for driving the slider. The shaping head 12 is attached to the slider and is moved in the XY direction by the head movement portion 11. The shaping head 12 places the pore-forming material and the raw material and, in addition, sinters the raw material. The shaping head 12 includes a raw material nozzle 13, a pore-forming material nozzle 14, and a sintering portion 15. The raw material nozzle 13 is a nozzle for placing the tabular grains and the raw material grains such that the tabular grains are arranged in the predetermined direction with respect to the partition surface while the tabular grains and the raw material grains constitute the raw material for forming the partition. The raw material nozzle 13 has an end opening portion formed into the shape of a slit and discharges the tabular grains and the raw material grains while the flat surfaces of the tabular grains are arranged uniformly in the slit direction. The pore-forming material nozzle 14 is a nozzle for placing the pore-forming material, which forms pores in the partition. In the case where the pore-forming material is a resin, the shaping head 12 may be provided with a solidification portion in accordance with the resin. For example, in the case where the pore-forming material is a photo-curable resin, a solidification portion that radiates light for curing is provided. The sintering portion 15 sinters the placed raw material and burns off the placed pore-forming material. The sintering portion 15 may sinter the raw material by, for example, laser irradiation. Examples of types of the laser include a solid laser, e.g., Nd:YAG laser, and a gas laser, e.g., $CO_2$ laser. The shaping head 12 may be provided with a support material nozzle, which discharges a support material other than the pore-forming material for supporting the raw material, and the like.

The pedestal 16 is a stage (base material), on which the raw material and the pore-forming material are formed, and the honeycomb structure 40 is placed thereon. The pedestal 16 is a rectangular plate and is vertically moved inside the shaped object accommodation portion 18, which is a space formed at the center of the apparatus, by the lifting portion 17. The shaped object accommodation portion 18 is a rectangular parallelepiped or cubic space, which is open upward, and is composed of four rectangular walls and a rectangular bottom surface. The shaped object accommodation portion 18 is disposed below the head movement portion 11 and the shaping head 12. The shaped object accommodation portion 18 is a location of placement of a shaped material (honeycomb structure 40) produced by the three-dimensional shaping apparatus 10. For example, the shaped object accommodation portion 18 may be formed so as to have a size in accordance with the external dimensions of the honeycomb structure 40 such that the honeycomb structure 40 to be produced can be accommodated. The lifting portion 17 is a mechanism for vertically moving the pedestal 16. For example, the lifting portion 17 may be composed of a ball screw and a drive motor for driving the ball screw or may include a piston and a drive portion for driving the piston. The lifting portion 17 moves the pedestal 16 downward such that the position in the height direction of the honeycomb structure 40 formed by the shaping head 12 is kept constant. The honeycomb structure 40 is shaped inside the shaped object accommodation portion 18.

The control portion 21 controls the entire apparatus and is configured to serve as, for example, a microprocessor, in which the centerpiece is CPU. The control portion 21 outputs control signals to the head movement portion 11, the shaping head 12, the lifting portion 17, and the like so as to cause repetition of placement of the pore-forming material, placement of the raw material, and sintering of the raw material a plurality of times. The memory portion 22 stores data and programs related to control of the apparatus. The memory portion 22 stores porous body data 23, three-dimensional shaping programs, and the like. The porous body data 23 are data including a pore structure (for example, the structure related to positions, sizes, and the like of pores in the partitions 42), a partition structure (for example, the structure related to the thickness of the partition 42, the size of the cell 44, positional relationships between a plurality of cells 44, and the like), and the like of the honeycomb structure 40. For example, the porous body data 23 may be voxel data including a plurality of voxels, where the positions are represented by XYZ coordinates, and information with respect to the attribution of the individual voxels to the partition 42, the pore, or the cell 44. The porous body data 23 may be data obtained by CT scanning with respect to the actual honeycomb structure 40 or be data obtained by further processing the scanned data. Alternatively, the porous body data 23 may be data empirically determined by structure analysis of an ideal pore structure or simulation. The control portion 21 drives and controls the head movement portion 11, the shaping head 12, and the lifting portion 17 so as to reproduce the structure of the porous body data 23.

Figure 3:
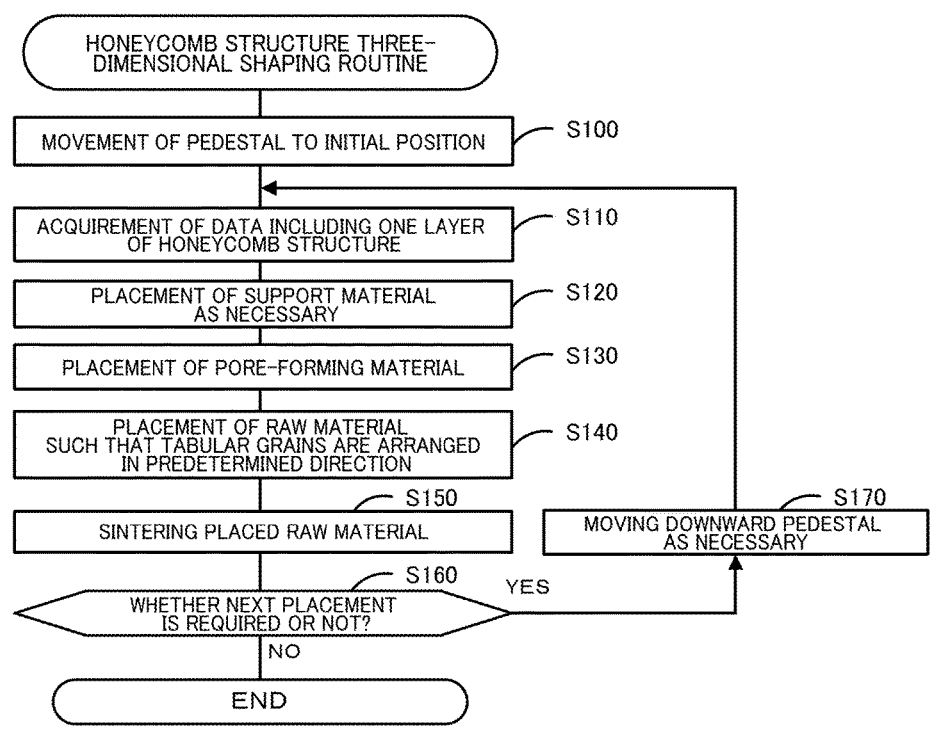
FIG. 3 is a flow chart showing an example of honeycomb structure three-dimensional shaping routine.

Next, production process of the honeycomb structure 40 by the three-dimensional shaping apparatus 10 will be described. FIG. 3 is a flow chart showing an example of honeycomb structure three-dimensional shaping routine. FIGS. 4A to 4H are explanatory diagrams showing an example of three-dimensional shaping of the honeycomb structure 40 by the honeycomb structure three-dimensional shaping routine. FIGS. 4A to 4D are sectional views in the direction along the partition surface 45. FIGS. 4E to 4H are sectional views of FIGS. 4A to 4D, respectively, along a line A-A shown in FIG. 4A or its equivalent. Here, production of the honeycomb structure 40, in which flat surfaces 35 of the tabular grains 34 (refer to FIG. 4C) are arranged in the direction perpendicular to the partition surface 45 and in the direction parallel to the cell formation direction (axis direction shown in FIG. 2), will be mainly described. As shown in FIG. 1, the three-dimensional shaping apparatus 10 produces the honeycomb structure 40 in the state of being placed in the vertical direction such that the upper surface of the pedestal 16 and the surface direction of the honeycomb structure 40 became horizontal. Also, the three-dimensional shaping apparatus 10 performs each treatment on a layer-by-layer basis, where the thickness of the layer is on the basis of the size of the tabular grain 34.

The honeycomb structure three-dimensional shaping routine is stored in the memory portion 22, and is executed in accordance with an input to an operation panel by the operator. When the routine is started, first, the control portion 21 causes movement of the pedestal 16 of the shaped object accommodation portion 18 to an initial position (Step S100). The initial position of the pedestal 16 may be determined in advance as, for example, a height at which an initial step in the structure formation process (for example, the support material placement step) can be executed. Subsequently, the control portion 21 acquires data including one layer of structure to be shaped next in the honeycomb structure 40 on the basis of the porous body data 23 (Step S110). In the present embodiment, the three-dimensional shaping apparatus 10 forms the honeycomb structure 40 in the direction along the partition surface 45 of the partition 42, that is, in the direction along the axis direction shown in FIG. 2. In this regard, in Step S110, the porous body data 23 may be data representing each layer of the structure and the control portion 21 may acquire a layer of data by reading the data concerned or the control portion 21 may acquire data by processing the porous body data 23 so as to form a layer of data.

Figure 4A:
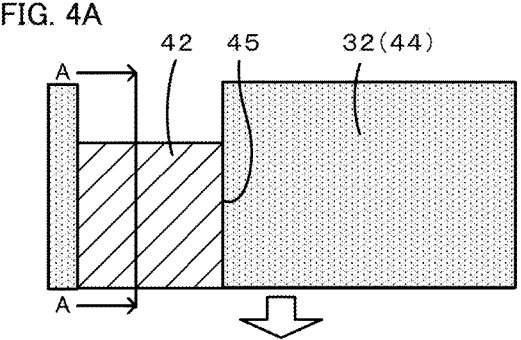
FIGS. 4A to 4H are explanatory diagrams showing three-dimensional shaping routine of the honeycomb structure.
Figure 4E:
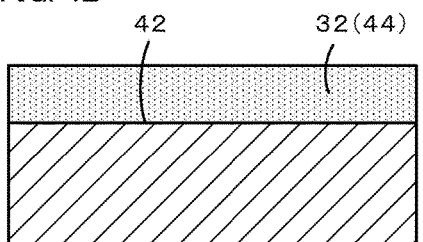
Figure 4B:
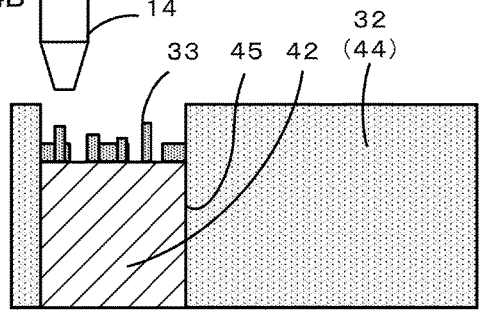

Next, as necessary, the control portion 21 causes placement of the support material on the basis of the acquired data (Step S120). Here, the resin of the pore-forming material is used as the support material. The support material is set to be placed in, for example, a region that is a space with respect to the honeycomb structure 40 and is a region on which the raw material has to be placed later. The control portion 21 makes the head movement portion 11 move the shaping head 12 in the lateral direction and the forward and backward directions and makes the pore-forming material nozzle 14 discharge the resin into the above-described region so as to solidify the resin. As shown in FIGS. 4A and 4E, the control portion 21 causes placement of the support material 32 in, for example, the region corresponding to the cell 44.

Figure 4F:
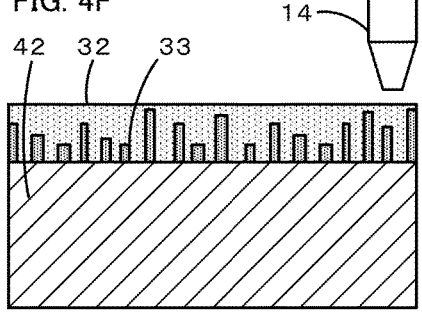
Figure 4C:
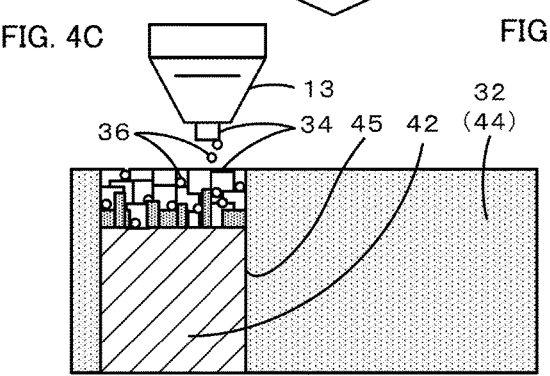
Figure 4G:
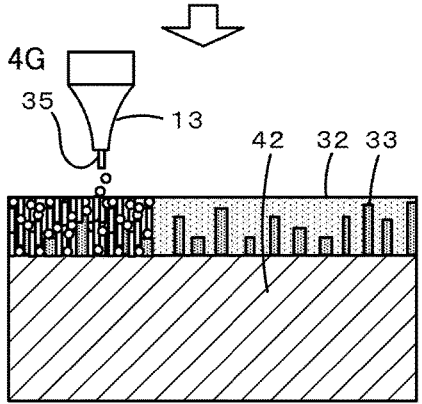
Figure 4D:
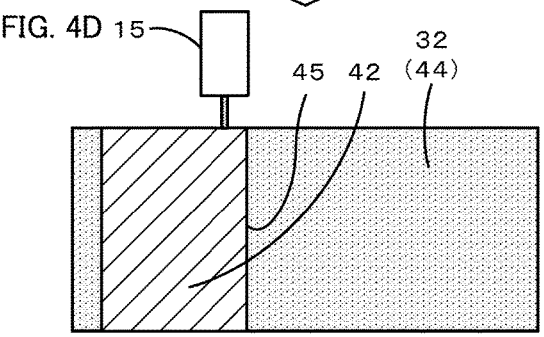
Figure 4H:
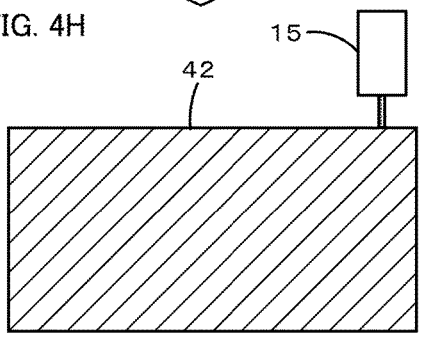

Then, the control portion 21 causes placement of the pore-forming material (Step S130). The control portion 21 causes placement of the pore-forming material such that regions corresponding to pores in the honeycomb structure 40 are reproduced. The control portion 21 makes the head movement portion 11 move the shaping head 12 in the lateral direction and the forward and backward directions and makes the pore-forming material nozzle 14 discharge the resin into the pore regions so as to solidify the resin. As shown in FIGS. 4D and 4F, the control portion 21 causes placement of the pore-forming material 33 in the regions corresponding to the pores to be formed in the partition 42. Thereafter, the control portion 21 causes placement of the raw material such that the tabular grains 34 are arranged in a predetermined direction (Step S140). The control portion 21 causes placement of the raw material such that regions corresponding to the partition 42 in the honeycomb structure 40 is reproduced. At this time, as shown in FIGS. 4C and 4G, the control portion 21 makes the tabular grains 34 to be discharged while the direction of the slit of the raw material nozzle 13 is fixed to the direction suitable for arranging the flat surfaces 35 of the tabular grains 34 in the direction, for example, perpendicular to the partition surface 45. A mixture of the tabular grains 34 (for example, kaolin) and raw material grains (for example, talc) can be used as the raw material. Subsequently, the control portion 21 causes sintering of the placed raw material (Step S150). The control portion 21 makes the sintering portion 15 scan and makes the sintering portion 15 radiate laser so as to sinter the placed raw material. At this time, as shown in FIGS. 4D and 4H, the placed pore-forming material 33 is burnt off, the partition 42 is formed and, in addition, pores are formed in the partition 42 (pores are not shown in the drawing).

Subsequently, the control portion 21 judges whether a next placement is required or not in consideration of the reproduction state of the porous body data 23 (Step S160). If the next placement is required, the pedestal 16 is made to move downward, as necessary, (Step S170), and the treatments of Step S110 and the following steps are executed repeatedly. That is, the control portion 21 acquires the data of a next layer and causes placement of the support material, as necessary, placement of the pore-forming material, placement of the tabular grains arranged in a predetermined direction, and sintering of the raw material containing the tabular grains. On the other hand, if it is judged in Step S160 that there is no next treatment, that is, when the honeycomb structure 40 is completed, the control portion 21 causes movement of the pedestal 16 to the initial position and terminates the routine. The honeycomb structure 40, which has an ideal pore structure and in which crystal grains are arranged in a predetermined direction (refer to FIG. 2) can be produced through such steps.

Here, the correspondence between the constituent factors of the present embodiment and the constituent factors of the present invention will be made clear. The shaping head 12 and the pore-forming material nozzle 14 in the present embodiment correspond to the pore-forming material placement portion in the present invention, the shaping head 12 and the raw material nozzle 13 correspond to the raw material placement portion, the shaping head 12 and the sintering portion 15 correspond to the sintering portion, and the control portion 21 corresponds to the control portion.

In the method for manufacturing a honeycomb structure according to the present embodiment described above, the tabular grains having different thermal characteristics, e.g., thermal expansion coefficient, on a crystal axis basis are arranged in the preferable directions and grains are grown by sintering. Therefore, for example, the thermal stability, e.g., thermal shock resistance on the basis of the thermal expansion coefficient, of the honeycomb structure can be further enhanced. Also, the tabular grains 34 are placed by being supplied from the raw material nozzle 13 having a slit arranged in the predetermined direction relative to the partition surface 45 and, therefore, the directions of the tabular grains can be relatively easily arranged by using the slit. Further, the flat surfaces 35 of the tabular grains 34 are arranged in the direction perpendicular to the partition surface 45 and, therefore, the thermal stability in the surface direction of the honeycomb structure 40 can be further enhanced. For example, in the case where the honeycomb structure is produced by extrusion, it is not possible to arrange the tabular grains in the direction perpendicular to the partition surface. However, according to the three-dimensional shaping apparatus 10, such arrangement can be performed freely. In addition, the tabular grains 34 including kaolin grains and raw material grains 36 including talc grains are used, the tabular grains 34 are arranged in the predetermined direction and, therefore, the thermal stability of the partition 42 including cordierite can be further enhanced. Also, the tabular grains 34 and the raw material grains 36 are placed in the mixed state and a reaction between them easily occurs during sintering. Also, the honeycomb structure 40 is formed in the direction (surface direction) perpendicular to the partition surface 45 and the honeycomb structure 40, in which the flat surfaces of the crystal grains 46 are arranged in the surface direction, can be produced. Further, the pore-forming material placement step and the raw material placement step are performed by using the three-dimensional shaping apparatus 10 and, therefore, the honeycomb structure having an ideal pore structure can be produced and the honeycomb structure, in which the crystal grains 46 are arranged in the predetermined direction, can be produced with a relatively high degree of freedom.

According to the manufacturing method, in which extrusion is used, in the related art, for example, the honeycomb structure is produced by supplying the raw material (body) to an extruder and passing through a mouthpiece for forming the honeycomb structure. However, the mixed body before passing through the mouthpiece is a homogeneous mixture of various materials. Therefore, the pore characteristics, e.g., the porosity and the average pore diameter, of the honeycomb structure after firing of the material and the distribution of the materials are basically uniform in the structure. On the other hand, according to the method for manufacturing a honeycomb structure of the present embodiment, placement positions, amounts of placement, and the like of the pore-forming material 33, the tabular grains 34, and the raw material grains 36 are controlled freely and, thereby, the pore characteristics, e.g., the porosity and the average pore diameter, distribution of the materials (constituent elements, crystal phases, and the like), cell structures, cell shapes, cross-sectional shapes, and the like can be freely changed in the axis direction (total length direction) and surface direction (diameter direction) in the honeycomb structure. Also, according to the method for manufacturing a honeycomb structure of the present embodiment, the structure characteristics of the honeycomb structure can be freely changed by controlling the placement direction of the tabular grains. Consequently, in the honeycomb structure of the present embodiment, for example, the pore characteristics, e.g., the porosity and the average pore diameter, and the material itself can be freely changed in the axis direction and in the surface direction of the honeycomb structure. For example, the exhaust gas cleaning performance can be improved, the amount of catalysts including noble metals can be reduced, and the cost can be reduced.

Meanwhile, the three-dimensional shaping apparatus 10, which is an apparatus for manufacturing a honeycomb structure according to the embodiment, includes the raw material nozzle 13, the pore-forming material nozzle 14, the sintering portion 15, and the control portion 21, the tabular grains having different thermal characteristics, e.g., thermal expansion coefficient, on a crystal axis basis are arranged in the preferable direction, and grains are grown during firing. Therefore, for example, the thermal stability, e.g., thermal shock resistance based on the thermal expansion coefficient, of the honeycomb structure can be further enhanced.

Also, the honeycomb structure 40 includes partitions 42 that contain cordierite, in which the crystal grains 46 resulting from the tabular grains 34 in the raw material are arranged in the direction perpendicular to the partition surfaces 45, and form cells 44. Therefore, for example, the thermal stability, e.g., thermal shock resistance based on the thermal expansion coefficient, of the honeycomb structure can be further enhanced.

In this regard, the present invention is not limited to the above-described embodiment and can be realized in various forms within the technical scope of the present invention, as a matter of course.

Figure 5:
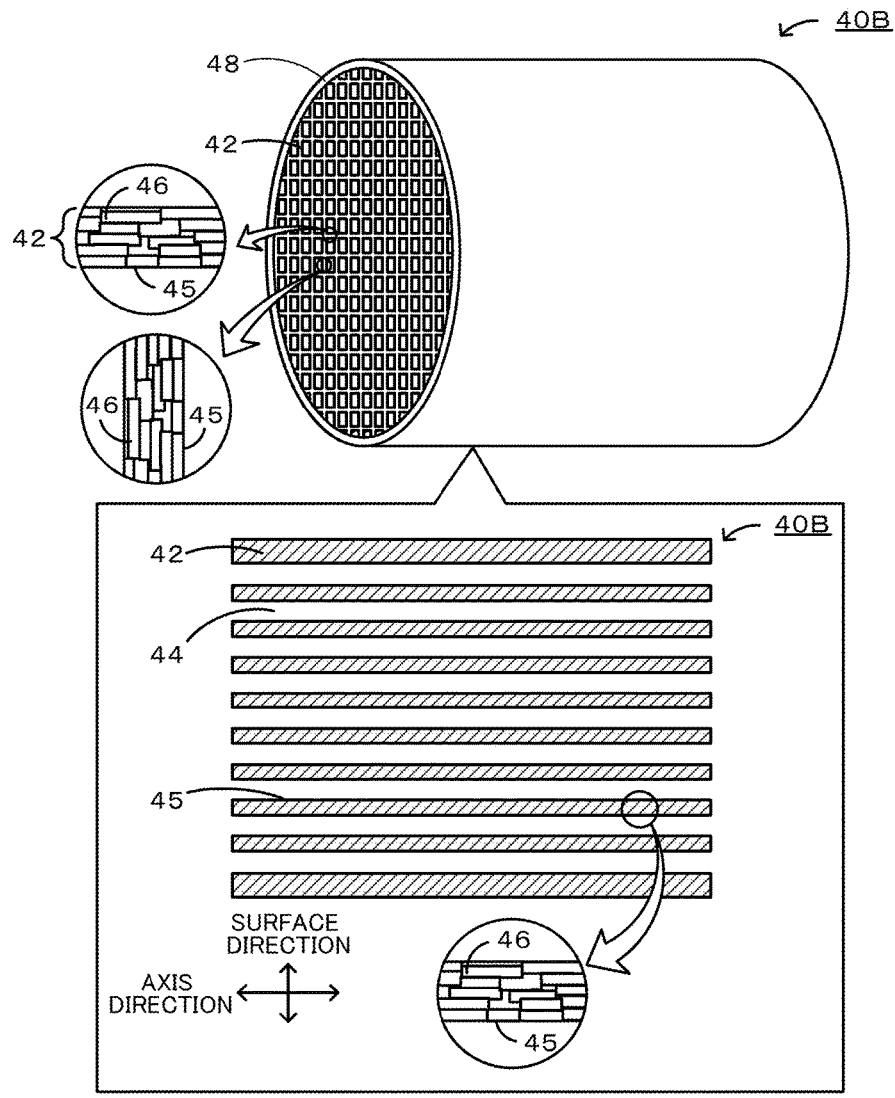
FIG. 5 is an explanatory diagram of a honeycomb structure 40B in which the predetermined direction of the tabular grains is changed.

For example, in the honeycomb structure 40 of the above-described embodiment, flat surfaces of the crystal grains 46 are arranged in the direction perpendicular to the partition surfaces 45 and in the direction parallel to the cell 44 formation direction (axis direction shown in FIG. 2), but are not limited to this. For example, as shown in FIG. 5, a honeycomb structure 40B, in which flat surfaces of the crystal grains 46 are arranged in the direction parallel to the partition surfaces 45 (axis direction shown in FIG. 2), may be employed. FIG. 5 is an explanatory diagram of the honeycomb structure 40B in which the predetermined direction of the tabular grains is changed. In this case as well, a honeycomb structure can be produced by a new manufacturing method. Also, the thermal characteristics of the honeycomb structure can be improved.

Figure 6:
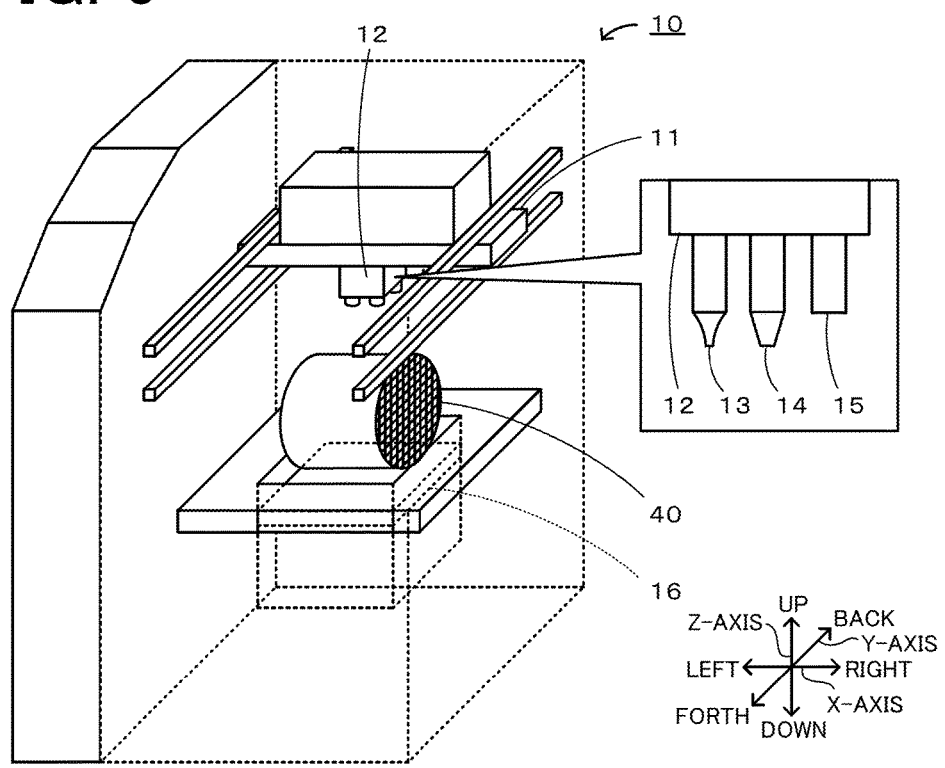
FIG. 6 is an explanatory diagram of the three-dimensional shaping apparatus 10 when the honeycomb structure is stacked in the surface direction.

In the above-described embodiment, the honeycomb structure 40 is formed in the direction along the partition surface 45 (axis direction shown in FIG. 2). However, as shown in FIG. 6, the honeycomb structure may be formed in the direction orthogonal to the partition surface 45 (surface direction shown in FIG. 2). FIG. 6 is an explanatory diagram of the three-dimensional shaping apparatus 10 when the honeycomb structure is stacked in the surface direction. At this time, the three-dimensional shaping apparatus 10 produces the honeycomb structure 40 while the honeycomb structure 40 is horizontally placed such that the upper surface of the pedestal 16 and the axis direction of the honeycomb structure 40 become horizontal. In this case as well, the honeycomb structure in which the tabular grains are arranged in the predetermined direction can be produced.

Figure 7:
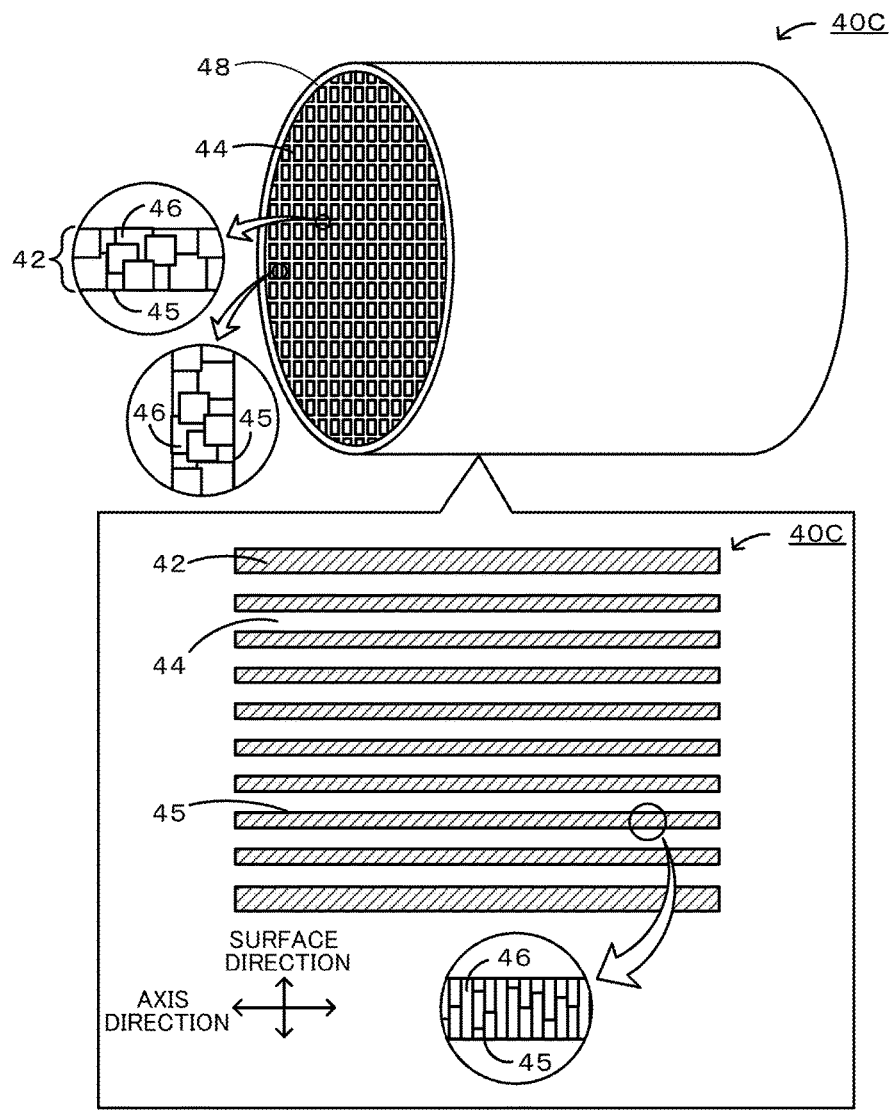
FIG. 7 is an explanatory diagram of a honeycomb structure 40C in which the predetermined direction of the tabular grains is changed.

In the honeycomb structure 40 of the above-described embodiment, flat surfaces of the crystal grains 46 are arranged in the direction perpendicular to the partition surfaces 45 and in the direction parallel to the cell formation direction (axis direction shown in FIG. 2), but are not limited to this. For example, as shown in FIG. 7, a honeycomb structure 40C, in which flat surfaces of the crystal grains 46 are arranged in the direction perpendicular to the partition surfaces 45 and in the direction orthogonal to the cell 44 formation direction (surface direction shown in FIG. 2), may be employed. A method for manufacturing the honeycomb structure 40C will be described. Regarding the honeycomb structure 40C, as shown in FIG. 6, the honeycomb structure is produced while being placed in the lateral direction. FIGS. 8A to 8H are explanatory diagrams of three-dimensional shaping of the honeycomb structure 40C in which the predetermined direction of the tabular grains is changed. FIGS. 8A to 8D are sectional views in the direction along the partition surface 45. FIGS. 8E to 8H are sectional views of FIGS. 8A to 8D, respectively, along a line A-A shown in FIG. 8A or its equivalent. In production of the honeycomb structure 40C as well, the above-described honeycomb structure three-dimensional shaping routine is executed. The control portion 21 causes formation of the support material 32 in a region corresponding to the cell 44 or below an overhang portion, for example, (FIGS. 8A and 8E). Thereafter, the control portion 21 causes placement of the pore-forming material 33 such that regions corresponding to pores to be formed in the partition 42 are reproduced (FIGS. 8D and 8F) and causes placement of the raw material such that the region corresponding to the partition 42 is reproduced (FIGS. 8C and 8G). The raw material is placed while the direction of the slit of the raw material nozzle 13 is fixed to the direction suitable for arranging the flat surfaces 35 of the tabular grains 34 in the direction perpendicular to the partition surface 45 and in the direction orthogonal to the formation direction of the cell 44 (surface direction shown in FIG. 2). Subsequently, the control portion 21 makes the sintering portion 15 scan and makes the sintering portion 15 radiate laser so as to sinter the placed raw material (FIGS. 8D and 8H). Consequently, the honeycomb structure, in which the tabular grains are arranged in the predetermined direction, can be produced.

In the above-described embodiment, the support material placement step, the pore-forming material placement step, the raw material placement step, and the sintering step are performed in this order. However, different orders may be employed or at least two steps may be performed in combination or at the same time as long as the porous body can be produced. Meanwhile, it is not necessary that all the plurality of times of structure formation processes are performed in the same order and some structure formation processes may be different from other structure formation processes. For example, the control portion 21 may execute the raw material placement step after execution of the pore-forming material placement step in at least one structure formation process among the plurality of times of structure formation processes. Alternatively, at least one of the support material placement step, the pore-forming material placement step, the raw material placement step, and the sintering step may be omitted in some structure formation processes. For example, the pore-forming material placement step is not performed in sane structure formation processes among the plurality of times of structure formation processes.

In the above-described embodiment, the control portion 21 causes removal of the pore-forming material 33 by burning off in the sintering step but the method is not limited to this. A removal step of removing the pore-forming material 33 may be performed separately from the sintering step. For example, at least one of before and after the sintering step, the pore-forming material 33 may be removed by heating the pore-forming material 33 by the sintering portion 15. Also, it is not necessary that the removal step of the pore-forming material 33 be performed in the structure formation process. For example, after the entire shape of the honeycomb structure 40 is formed, the pore-forming material 33 in the shaped honeycomb structure 40 may be removed at a time by heating. In the case where the pore-forming material 33 is removed at a time, for example, a heater included in the three-dimensional shaping apparatus 10 may be used and the control portion 21 may perform the removal step of heating inside the casing, or the operator may take out the honeycomb structure 40 from the three-dimensional shaping apparatus 10 and perform the removal step by using another apparatus. Alternatively, the pore-forming material may be removed by a method other than heating. For example, after the operator takes out the honeycomb structure 40 from the three-dimensional shaping apparatus 10, the pore-forming material may be removed by dissolving the pore-forming material with a liquid (solvent or the like). Examples of such pore-forming materials include water-soluble resins. In the case where the pore-forming material is not eliminated in the sintering step, a material that is not eliminated in the sintering step may be used as the pore-forming material.

In the above-described embodiment, the control portion 21 performs the pore-forming material placement step by using the same method as the fused deposition modeling but other methods may be used as long as the pore-forming material for forming pores in the porous body can be placed. For example, the control portion 21 may cause placement of the pore-forming material by using PolyJet method (also referred to as an ink-jet method). That is, the control portion 21 may make the pore-forming material nozzle 14 eject a liquid pore-forming material (for example, ultraviolet-curing resin) so as to place the pore-forming material on the pedestal 16 and make UV light radiate ultraviolet rays so as to cure the placed pore-forming material. In this case, UV light for radiating ultraviolet rays may be disposed under the shaping head 12. In this case as well, the pore-forming material can be placed in the same manner as in the above-described embodiment. In this regard, the ultraviolet-curable resin is a material that is eliminated by heating and, therefore, can be removed in the sintering step in the same manner as in the above-described embodiment.

In the above-described embodiment, the pore-forming material 33 is set to be a material that is cured after being placed. However, the pore-forming material after placement is not limited to this but may be, for example, a paste or grains. For example, a paste containing starch or grains of starch may be used as the pore-forming material. In this regard, starch is eliminated by heating and, therefore, can be removed in the sintering step in the same manner as in the above-described embodiment. In the case where the pore-forming material is the paste or the grains, it is preferable that placement of the pore-forming material be performed by scattering from above by using a recoater or the like. In this case, positional deviation of the pore-forming material does not easily occur.

In the above-described embodiment, the pore-forming material is set to be the resin, the ceramic grains, and the like. However, a kneaded material of grains that are not eliminated by heating during the sintering step and a material that can be fused and cured, is fused by heating and is eliminated by fusion may be used. Examples of grains that are not eliminated include ceramic grains. Examples of materials that are eliminated by fusion include resins, e.g., thermoplastic resins, photo-curable resins, and thermosetting resins. In the case where grains that are not eliminated and a material that is eliminated by fusion are used as the pore-forming material as well, the same pore-forming material placement step as that in the above-described embodiment may be performed. In this regard, the material that is not eliminated may be removed by a blower or the like after the honeycomb structure is formed. Consequently, the pore-forming material contains grains that are not eliminated, the grains that are not eliminated remain after the sintering step and, thereby, the pore-forming material can be further placed on the grains that are not eliminated in the next structure formation process. Therefore, large pores that cross over structures formed by a plurality of structure formation processes can be easily formed compared with the above-described embodiment. In addition, already present pores are prevented from being filled with the tabular grains 34 and the raw material grains 36 in the next structure formation process because the grains that are not eliminated are left.

In the above-described embodiment, the sintering portion 15 is set to radiate laser but is not limited to this as long as the tabular grains 34 and the raw material grains 36 are sintered. Methods other than laser may be employed. For example, the sintering portion 15 may sinter the raw material by arc discharge.

In the above-described embodiment, the laser irradiation position is controlled by moving the sintering portion 15 by the head movement portion 11 but is not limited to this. For example, the laser irradiation position may be controlled by changing the direction of a mirror for reflecting the laser. For example, the control portion 21 may use a known galvanometer so as to change the direction of the mirror.

In the above-described embodiment, the raw material grains and the pore-forming material are placed by using the raw material nozzle 13 and the pore-forming material nozzle 14. However, the method is not limited to this as long as each material can be placed while the direction of the tabular grains is set. For example, at least one of the tabular grains, the raw material grains, and the pore-forming material may be placed by a squeegee.

In the above-described embodiment, the case where the honeycomb structure is produced as an example of the porous body is described. The porous body is not limited to this and a porous body having any shape may be produced. The materials for forming the tabular grains and the raw material grains are not limited to the above-described embodiment. Also, in the above-described embodiment, the case where the honeycomb structure is produced by using a single three-dimensional shaping apparatus 10 is described. The method is not limited to this and, for example, the steps of the structure formation process may be shared among a plurality of apparatuses.

In the above-described embodiment, applications of the present invention to the three-dimensional shaping apparatus 10 serving as the apparatus for manufacturing a porous body and the method for manufacturing a porous body are described but the present invention is not limited to these. For example, the present invention may be applied to a program that is stored in the memory portion 22 and makes the three-dimensional shaping apparatus 10 execute the three-dimensional shaping routine.

The present application claims priority from Japanese Patent Application No. 2015-179728 filed on Sep. 11, 2015, the entire contents of which are incorporated herein by reference.

What is claimed is:

1. A method for manufacturing a honeycomb structure provided with partitions forming a plurality of cells, comprising the step of repeating a structure formation process a plurality of times,
    wherein the structure formation process includes a pore-forming material placement step of placing a pore-forming material for forming pores in the partitions, a raw material placement step of placing tabular grains and raw material grains such that the tabular grains are arranged in a predetermined direction with respect to partition surfaces of the partitions while the tabular grains and the raw material grains constitute a raw material for forming the partitions, and a sintering step of sintering the placed raw material.

2. The method for manufacturing a honeycomb structure according to claim 1, wherein the tabular grains are placed by being supplied from a slit arranged in a predetermined direction with respect to the partition surfaces in the raw material placement step.

3. The method for manufacturing a honeycomb structure according to claim 1, wherein flat surfaces of the tabular grains are arranged in a direction perpendicular to the partition surfaces in the raw material placement step.

4. The method for manufacturing a honeycomb structure according to claim 1, wherein flat surfaces of the tabular grains are arranged in a direction parallel to the partition surfaces in the raw material placement step.

5. The method for manufacturing a honeycomb structure according to claim 1,
    wherein in the structure formation process, partitions containing cordierite are formed, and
    the tabular grains include kaolin grains and the raw material grains include talc grains.

6. The method for manufacturing a honeycomb structure according to claim 1, wherein the tabular grains and the raw material grains are placed in a mixed state in the raw material placement step.

7. The method for manufacturing a honeycomb structure according to claim 1, wherein in the structure formation process, the pore-forming material is placed on a predetermined base material or on a member, which is formed in advance of the structure formation process, in the pore-forming material placement step; the raw material is placed on the placed pore-forming material or in a space formed around the pore-forming material in the raw material placement step; and the placed raw material is sintered and, at the same time, the pore-forming material is removed in the sintering step.

8. The method for manufacturing a honeycomb structure according to claim 1, wherein in the structure formation process, the honeycomb structure is formed in a direction along the partition surfaces.

9. The method for manufacturing a honeycomb structure according to claim 1, wherein in the structure formation process, the pore-forming material placement step and the raw material placement step are performed by using a three-dimensional shaping apparatus.

* * * * *